United States Patent [19]

Parekh et al.

[11] 4,379,911

[45] Apr. 12, 1983

[54] CROSS-LINKING AGENTS FOR CATIONIC POLYMERS

[75] Inventors: Girish G. Parekh, Fairfield; Werner J. Blank, Wilton; Peter J. Schirmann, Fairfield, all of Conn.

[73] Assignee: American Cyanamid Company, Stamford, Conn.

[21] Appl. No.: 403,202

[22] Filed: Jul. 29, 1982

Related U.S. Application Data

[60] Continuation of Ser. No. 232,454, Feb. 9, 1981, abandoned, which is a continuation of Ser. No. 128,612, Mar. 10, 1980, abandoned, which is a division of Ser. No. 32,982, Apr. 25, 1979, abandoned, which is a continuation-in-part of Ser. No. 926,762, Jul. 21, 1978, abandoned.

[51] Int. Cl.³ .............................................. C08G 12/32
[52] U.S. Cl. ................................. 528/245; 204/181 C; 204/181 R; 428/460; 428/524; 528/254; 525/519
[58] Field of Search ................................ 528/245, 254

[56] References Cited

U.S. PATENT DOCUMENTS

| 3,450,660 | 6/1969 | Sekmakas | 528/254 X |
|---|---|---|---|
| 3,519,627 | 7/1970 | Coats et al. | 528/254 X |
| 3,630,998 | 12/1971 | Schibler | 528/254 X |
| 3,806,480 | 4/1974 | Leonard | 528/254 X |
| 3,858,273 | 1/1975 | Goldstein et al. | 528/245 X |
| 3,862,224 | 1/1975 | Petersen et al. | 528/245 X |
| 4,026,855 | 5/1977 | Parekh et al. | 204/181 X |
| 4,039,496 | 8/1977 | Hermann | 528/245 X |

FOREIGN PATENT DOCUMENTS 1195087  6/1970  United Kingdom .

Primary Examiner—Howard E. Schain
Attorney, Agent, or Firm—Steven J. Hultquist

[57] ABSTRACT

Amino-formaldehyde products with activated carboxylic ester groups cross-link compounds containing pendant primary or secondary amine groups.

2 Claims, No Drawings

CROSS-LINKING AGENTS FOR CATIONIC POLYMERS

This is a continuation of application Ser. No. 232,454, filed Feb. 9, 1981, which is a continuation of Ser. No. 128,612, filed Mar. 10, 1980, which is a divisional of Ser. No. 032,982, filed Apr. 25, 1979, which is a continuation-in-part of Ser. No. 926,762, filed July 21, 1978, all now abandoned.

This invention relates to cross-linking agents for compounds which are cross-linked through pendant primary or secondary amine groups thereon. The cross-linking agents are essentially amino-formaldehyde products which have been modified to contain activated carboxylic ester groups. The invention further relates to the resultant cross-linked product. In particular this invention relates to cross-linking agents prepred from melamine resins modified by activated carboxylic ester groups.

Amino resins find use in surface coatings, and adhesives for metals, textiles, wood, etc. Most of the presently used amino cross-linking agents cross-link under acidic conditions with polymers containing alcoholic hydroxy, amide, and carboxylic acid groups. Many of these anionic polymers, and amino cross-linking agents are used in anodic electrodepostion of paints on metals. In the last 10 years, a number of patents have claimed many advantages of cathodic electrocoating systems over anodic electrocoating systems, especially in improved chemical resistant properties of the cationic films obtained by cathodic electrodeposition. The most common methods described in the literature to cross-link such cationic systems is via a blocked polyisocyanate which de-blocks at high temperatures to form a polyisocyanate, which in turn cross-linkds with cationic polymers. However, during de-blocking volatiles come off which are toxic and pollute the environment.

U.S. Pat. No. 3,519,627 discloses carboxyl-modified ethers of amino-formaldehyde condensates as cross-linking agents for other carboxyl-, hydroxyl-, or amide-containing resins. These cross-linking agents are inoperative as such for products containing pendant primary or secondary amine groups.

U.S. Pat. No. 4,026,855 discloses cross-linking agents for cationic polymers of certain basicity with functional groups such as carboxy, hydroxy and amide groups. The cross-linking agents do not react with primary or secondary amine groups.

French Pat. No. 1,544,219 discloses transetherification of melamine-formaldehyde condensation products with butyl glycolate and then hydrolyzing them to form carboxylic acid-group containing water-soluble anionic resins as stated to be useful in electrocoating.

Accordingly, it is an object of the present invention to produce cross-linking agents to react with primary or secondary amine groups on a compound, especially, a polymer, and most especially, a cationic polymer.

It is a further object to produce cross-linking agents which are useful at reduced reaction temperatures.

These and other objects will be apparent from the following disclosure.

The present cross-linking agents are prepared from amino-formaldehyde products and activated carboxylic esters.

Amino-formaldehyde products useful herein may be obtained by condensation of formaldehyde and an amino compound such as melamine, urea, benzoguanamine, formaguanamine, acetoguanamine, glycoluril, cyclic ureas such as ethylene urea, propylene urea, 4,5-dihydroxy-ethylene urea and other similar materials. These formaldehyde condensation products contain methylol groups and all or part of these methylol groups may be etherified with an alcohol such as methanol, ethanol, isopropanol, propanol, or butanol. The etherification may be carried out under acidic reaction conditions. The reaction conditions employed for methylolation and subsequent alkylation by alcohols are well known in the art. Depending upon the type of condensation product desired the reaction may be carried out under acid or base and with varying conditions of time and temperature.

In order to make these amino-formaldehyde products reactive toward compounds containing primry or secondary amine groups, the products are etherified or transetherified, as the case may be, with an activated carboxylic ester so that the result is an amine reactive product.

Suitable esters are those containing the group —X—COOR wherein X is selected from

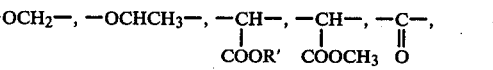

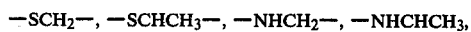

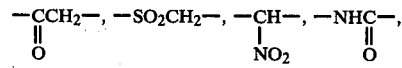

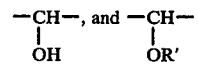

wherein R is an aliphatic moiety and wherein R' is alkyl of 1–8 carbon atoms.

This group may be either directly linked to the amino-formaldehyde product or it may be linked through a bridging unit. The nature of this bridging unit has been found to have essentially no influence on the reactivity of the cross-linkers of the present invention. Thus, the use of a bridging unit and/or the particular unit is basically one of convenience in preparing the compounds.

If a bridging unit is used, it must be attachable to both the amino-formaldehyde product and the activated carboxylic ester group. It further must be stable so as to not degrade during futher processing and/or use of the compound.

Examples of suitable bridging units include such as —OCH₂CH₂—, —OCH(CH₃)CH₂—, —OCH₂CH₂OCH₂CH₂—, —OCH₂CH₂CO—, and —NHCOCH₂CH₂—. Any other suitable group may be used.

The cross-linkers of the present invention have the structure

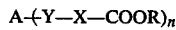

wherein A is the amino-formaldehyde product, Y is the bridging unit or nothing, X is as defined above, R is an aliphatic moiety and n is an integer of at least two, preferably at least 3.

The exact nature of R, which acts as a leaving group upon attack of the amine functionality of the activated ester cross-linker, has been found to be relatively insignificant so long as it is not too bulky to prevent approach of the attacking amine. Preferably, R is an alkyl group with 1–8 carbon atoms, a cycloalkyl group with 5–8 carbon atoms, or a cycloheteroalkyl group containing 5–8 atoms in the ring. These groups may be substituted with heteroatoms, $NO_2$ groups, ethers, halogens, alcohols, nitriles and amides. Thus, R may derive from alcohols such as 2-nitroethanol, 2-chloroethanol, 2-cyanoethanol, ethyleneglycol, propylene glycol, acetol, monoalkoxyethanols, furfuryl alcohol, tetrahydrofurfuryl alcohol, tetrahydropyran-2-methanol, tetrahydropyran-3-ol, and other similar compounds. Most preferably, R is alkyl with 1–4 carbon atoms.

There are basically two types of activated esters suitable for transetherification: (1) activated esters containing acidic hydrogen attached to a hereto atom such as O, N and S, i.e., methylglycolate, methyllactate, methylthioglycolate, ethyloxamate, and monoethyl oxalate, and (2) activated esters containing acidic hydrogen attached to carbon, i.e., diethyl malonate, methyl aceto acetate, ethyl cyano acetate, etc.

The amino-formaldehyde products may be esterified by Group One activated esters by their reaction under acidic conditions. The temperature and reaction time may vary depending upon the acid catalyst and the reactivity of the activated ester. The stronger acid catalysts such as mineral acids, and organic sulfonic acids require temperatures lower than 100° C. The weak acid catalysts and low reactive activated esters may require higher temperatures. The reaction time could vary from one half-hour to several hours. The Group Two activated esters can be hooked onto the amino-formaldehyde substrate by first halogenating a fully methylated aminoformaldehyde product with reagents such as thionyl chloride, phosphorous pentachloride or acetyl chloride. The resulting chloro compound may then be reacted with the sodium salt of the activated ester. Normally, the reaction temperature is below 100° C. and for a period of several hours.

For these activated ester modified amino-formaldehyde compounds to be effective cross-linking agents for compounds containing primary and/or secondary amine groups, there should be at least two and preferably three or more activated ester groups per molecule. These activated esters are capable of reacting with primary or secondary amines from as low as room temperature to 200° C. in a period of less than 30 minutes.

The compounds to be cross-linked by the cross-linking agents of the present invention contain pendant primary and/or secondary amine groups. Preferably, the compound is a polymer and most preferably, a cationic polymer. Amine groups can be attached to the compound by reacting free carboxyl groups on it (polyester, acrylic, urethane,) containing available carboxyl groups which can be reacted with alkyleneimine or substituted alkyleneimine, as proposed in U.S. Pat. No. 3,679,564, and U.S. Pat. No. 3,617,453, and incorporated herein by reference. Similarly, amine groups can be introduced into the compound by reacting pendant carboxylic acid groups on the compound with ethylene imine or derivatives of ethylene imine. Difunctional amines can also be reacted with reactive pendant carboxyl groups on the compound.

Blocked amines also can be attached to the compound and subsequently transformed into primary amine groups. Such blocked amine groups can be attached to epoxy resins or acrylic resins having pendant oxirane groups by reacting a ketimine blocked diethylene triamine, formed from reacting diethylene triamine with an excess of a ketone such as methyl ethyl ketone.

The primary and/or secondary amine groups are pendantly attached to the compound. For purposes of this invention, pendant amine groups include terminal amine groups. By pendantly attached is meant that such amine groups are attached to the compound or to a side chain of the compound.

The preferred polymer containing pendant amine groups should contain at least about 1% by weight of such pendant amine groups, and up to about 50% if desired.

Representative polymers containing pendant amine groups can be derived from epoxy and epoxy-modified diglycidyl ethers of bisphenol A structures, various aliphatic polyethylene or polypropylene glycol (diglycidyl ether) adducts, and glycidyl ethers of phenolic resins, such epoxy resins being commercially available and commonly used in the electrocoating field.

Other useful polymers containing pendant amine groups include polyamide resins, for example, condensation products of dimerized fatty acids coreacted with difunctional amine, such as ethylene diamine. Polyamide resins generally are between about 500 and 5,000 molecular weight. Further useful polymers containing pendant amine groups include acrylic resins having molecular weight of about 1,000 to about 1,000,000 or more, polyester resins and polyurethane resins both having a molecular weight range of about 500 to about 5,000, and vinyl resins.

Generally, the cross-linking agent is used in an amount to provide a ratio of ester groups to amine groups on the compound of about 0.3/1 to 3/1.

The following non-limiting examples demonstrate the preparation of the cross-linking agents and their use as such in cationic polymers.

EXAMPLE I

Preparation of Cross-linking Agent W

To a suitably equipped three-neck flask with stirrer were charged 300 parts hexamethoxymethylmelamine, 460 parts of methyllactate and 3 parts of concentrated nitric acid. The reaction mixture was heated to 65°–70° C. under reduced pressure for 5 hours. The methanol formed during the reaction was continuously removed by distillation under reduced pressure. After about 110 parts of methanol were removed, the reaction mixture was neutralized with sodium carbonate. The unreacted methyllactate was removed at 110° C. under reduced pressure. The resulting product, a viscous liquid, was filtered. The clear pale yellow syrupy product was analyzed by NMR and had the following composition: $Mel_1$, Form 5.8, $Me_{2.2}$, $Lact_{3.2}$. The final Gardner-Holdt viscosity was $Z_1$–$Z_2$.

EXAMPLE II

Preparation of Cross-Linking Agent X

A flask containing 300 parts of hexamethoxymethylmelamine (CYMEL 303 of American Cyanamid) and 3.3 parts of maleic anhydride was heated at 50°–55° C. until the solid anhydride went into solution. To this mixture 363 parts of ethyl N-2-hydroxyethyl oxamate was added under nitrogen. This mixture was heated to 95°–125° C. for 8 hours while continuously stripping methanol. After a total of 77 parts of methanol was removed heating was stopped and the material was cut to 80% solids with methylethyl ketone. The oxamate functionality was 2.8 per triazine.

EXAMPLE III

Preparation of Cross-Linking Agent Y

The procedure of Example I was repeated except that methyl glycolate was used in place of the methyl lactate. The glycolate functionality was about 3.2 per triazine.

EXAMPLE IV

Preparation of Cross-Linking Agent Z

To a suitably equipped three-neck flask with stirrer were charged 665 parts of diethoxymethyl dimethoxymethyl glycoluril, 1080 parts of methyl glycolate, and 8 parts of concentrated nitric acid. The reaction mixture was heated to 65°–75° C. under reduced pressure for 5 hours. The methanol/ethanol formed during the reaction was continuously removed by distillation under reduced pressure. After about 290 parts of methanol/ethanol mixture were removed, the reaction mixture was neutralized with sodium carbonate. The unreacted methyl glycolate was removed at 110° C. under reduced pressure. The resulting product, a viscous liquid, was filtered. The clear pale-yellow syrupy product was analyzed by NMR and had the following composition: $GU_1$ $Form_{3.8}$ $Me_{0.4}$ $Et_{0.6}$ $Gl_{2.6}$. The product was cut to 90% solids with n-butanol. The final Gardner-Holdt viscosity was X$^-$.

To test the cross-linking ability of the above agents the following two polymers were selected as being representative of compounds having primary or secondary amine groups.

Polymer A was prepared by reaction of one mole of Epon 828 (a diepoxide, obtained by condensation of one mole of bisphenol A and two moles of eipchlorohydrin; epoxide equivalent is 175–210) with two moles of 1,6-hexamethylene diamine. The equivalent weight of the polymer based on the primary amine content was about 300–320.

Polymer B was prepared by the reaction of one mole of Shell DRH-151 (a saturated diepoxide prepared from the condensation of one mole of hydrogenated bisphenol A and 2 moles of eipchlorohydrin) and one mole of Shell H-1 (a diketimine prepared from the condensation of one mole of diethylenetriamine and 2 moles of methyl isobutylketone). The equivalent weight of the polymer based on the (blocked) primary amine content was about 525.

EXAMPLE V

Four coating compositions were prepared from Polymer A using CYMEL 303, cross-linking agent X and cross-linking agent Y in combination with the cationic polymer A. One composition was without any cross-linking agent. The resin/cross-linking agent ratio was 70/30. Films were cast immediately after the preparation of coating compositions on zinc phosphate pretreated cold-rolled steel panels and baked at 150° and 175° C. for 20 minutes. The coating compositions and film properties are shown in the following table. The coating composition C was very reactive. It cross-linked at room temperature (25° C.) and gelled within a few minutes (<10 minutes). Composition D was less reactive and it gelled in two hours at room temperature.

As shown in Table I, the cationic polymer is non-self-cross-linkable. Even at 175° C. bake, the film was very tacky and had little solvent resistance. Films from composition B containing CYMEL 303 were very tacky when hot and had little solvent resistance indicating poor cross-linking efficiency. It is known that reaction of a fully alkylated melamine such as hexamethoxymethylmelamine is catalyzed by an acid catalyst and reacts with —OH, —CONH$_2$, and —COOH groups and the reaction is inhibited in the presence of organic amines. It is also known in the coatings industry that hexamethoxymethylmelamine does not react with cationic polymers containing basic amine groups under the curing temperature conditions used in the plants.

The films from coating compositions C and D were fully cross-linked at 150° C./20 minutes, indicating that cross-linking agent X and Y are efficient cross-linking agents for compounds polymers containing primary and secondary amino groups.

TABLE I

|  | A | B | C | D |
|---|---|---|---|---|
| Coating Compositions |  |  |  |  |
| Cationic Polymer A | 19 | 19 | 19 | 19 |
| CYMEL 303 | — | 7.5 | — | — |
| ACE Cross-Linking Agent X (80%) | — | — | 9.0 | — |
| ACE Cross-Linking Agent Y (100%) | — | — | — | 7.5 |
| Ethanol | 5 | 5 | 5 | 5 |
| Film Properties: |  |  |  |  |
| Baking Schedule, 150° C./20 Minutes: |  |  |  |  |
| Film Thickness, mil | 0.9 | 1 | 0.9 | 1 |
| Pencil Hardness | B-HB | 4B-3B | 2H | 3H-4H |
| Acetone Rub Resistance | 15 | 10 | 200+ | 200+ |
| Baking Schedule, 175° C./20 Minutes: |  |  |  |  |
| Film Thickness | 0.9 | 1 | 0.9-1.0 | 1 |
| Pencil Hardness | H-2H | F-H | 4H | 4H |
| Acetone Rub Resistance | <75 | <115 | 200+ | 200+ |

EXAMPLE VI

Coating compositions were prepared using activated ester cross-linking agents W, Y and Z in combination with cationic polymer B. The resin/cross-linking agent was approximately in the range of 70/30. The coating compositions were allowed to stand 4 hours before the film were cast on zinc phosphate pretreated cold rolled steel panels. The coated panels were exposed at room temperature for about 16 hours, in order to allow hyrolysis of the diketimine to form primary amines, then baked at 150° and 175° C. for 20 minutes. The coating compositions and film properties are shown in the following table. Coating compositions E and F were more reactive and gelled in 3 weeks. There was no change in composition G after 4 weeks.

The films from coating compositions E, F, and G were fully cross-linked at 175° C./20 minutes indicating they are suitable cross-linking agents for cationic polymers containing primary and secondary amine groups. Coating composition G was tacky at 150° C./20 minutes and had little solvent resistance indicating it had less cross-linking efficiency at that temperature than compositions E and F, which were fully cross-linked. The results are shown in Table II.

TABLE II

|  | E | F | G |
|---|---|---|---|
| Coating Compositions |  |  |  |
| Cationic Polymer B | 37 | 37 | 35 |
| ACE Cross Linking Agent Y(100%) | 15 | — | — |

TABLE II-continued

| | E | F | G |
|---|---|---|---|
| ACE Cross Linking Agent Z(90%) | — | 14 | — |
| ACE Cross Linking Agent W(92%) | — | — | 16 |
| 95% Ethanol | 5 | 5 | 5 |
| Film Properties | | | |
| Baking Schedule, 150° C./20 minutes | | | |
| Film Thickness, mil | 1.0 | 1.0 | — |
| Pencil Hardness | F-H | F-H | Tacky |
| MEK Solvent Resistance | 200+ | 200+ | 65 |
| Baking Schedule, 175° C./20 minutes | | | |
| Film Thickness, mil | 1.0 | 0.9 | 1.0 |
| Pencil Hardness | 4-5H | 3-4H | F-H |
| MEK Solvent Resistance | 200+ | 200+ | 200+ |

EXAMPLE VII

Cross-linking Agent X (33.9 parts) was mixed with 21.4 parts of cationic polymer "B" and 10 parts of 95% ethanol. This mixture was drawn immediately on amorphous chromate treated aluminum and was allowed to remain at room temperature. After 5 days the film had achieved resistance to methyl ethyl ketone of 200 plus double rubs and a Tukon hardness of 3.4.

The remainder of the above mixture gelled within ½ hour.

EXAMPLE VIII

Preparation and Testing of Cross-Linking Agent U

Melamine and glyoxylic acid are dissolved in dimethylsulfoxide and heated to 50°–80° C. for 5–8 hours. The solvent is removed and replaced by methanol. Sulfuric acid is added as a catalyst and the mixture heated to reflux for 5–10 hours, at which the solution is dried with a drying agent, i.e., 3A molecular sieve. The catalyst is neutralized with base and the methanol removed. The remaining mixture is filtered to yield methyl melamine glycolate methyl ether.

The procedure of Example V is repeated to show the effectiveness of Cross-Linking Agent U. Comparable results occur.

What is claimed is:

1. A cross-linking agent for compounds containing an average of at least two primary or secondary amine groups per molecule, comprising a melamine compound, the amine groups of which contain as substituents an average of at least two glyoxylic acid ester groups per molecule.

2. A cross-linking agent according to claim 1 wherein the melamine compounds is methyl melamine glycolate methyl ether.

* * * * *